(12) United States Patent
Carlson et al.

(10) Patent No.: US 7,806,961 B2
(45) Date of Patent: Oct. 5, 2010

(54) CONTROL INTERFACE FOR A VARIABLE SPEED FAN DEVICE

(75) Inventors: Casey L. Carlson, Edina, MN (US);
Glendon D. Kappel, Eagan, MN (US);
H. Aaron Christmann, White Bear Lake, MN (US)

(73) Assignee: EM Innovative Properties Company, St. Paul, MN (US)

( * ) Notice: Subject to any disclaimer, the term of this patent is extended or adjusted under 35 U.S.C. 154(b) by 1051 days.

(21) Appl. No.: 11/384,201

(22) Filed: Mar. 17, 2006

(65) Prior Publication Data

US 2007/0214956 A1 Sep. 20, 2007

(51) Int. Cl.
*B01D 46/00* (2006.01)

(52) U.S. Cl. .............................. 95/25; 95/273; 96/418; 55/467; 55/471

(58) Field of Classification Search ..................... 95/26, 95/1, 25, 273; 55/417, 467, 471, 472; 416/5; 96/418, 417; 362/89
See application file for complete search history.

(56) References Cited

U.S. PATENT DOCUMENTS 5,791,966 A 8/1998 Capps et al.
6,036,757 A 3/2000 Gatchell et al.
6,203,590 B1 3/2001 Byrd et al.
6,503,302 B2 * 1/2003 Wong ........................... 96/316
6,712,889 B2 * 3/2004 Pillion et al. ................... 96/418
2001/0045156 A1 11/2001 Mishima
2003/0070544 A1 * 4/2003 Mulvaney et al. .............. 95/25

FOREIGN PATENT DOCUMENTS

| CN | 2072610 U | | 3/1991 |
| CN | 2072610 U | | 3/1991 |
| JP | 3078035 U | * | 3/2001 |

* cited by examiner

*Primary Examiner*—Duane Smith
*Assistant Examiner*—Ives Wu
(74) *Attorney, Agent, or Firm*—Elizabeth A. Gallo

(57) ABSTRACT

A variable speed fan device includes a housing, a motor, a fan blade, a controller, and a first plurality of discrete light sources. The motor is maintained by the housing and the fan blade is connected to the motor. The controller is electronically coupled to the motor and manages an operational status of the variable speed fan device. The light sources are adapted to emit light from the display panel along a discontinuous perimeter at the exterior face. In an activated state, the light emitted by each light source is visually perceptible an exterior face of the display panel. The controller is programmed to individually activate and deactivate the light sources in a predetermined pattern creating a perception of movement of light about the discontinuous perimeter at the exterior face of the display panel corresponding with an operational status of the variable speed fan device.

11 Claims, 5 Drawing Sheets

CONTROL INTERFACE FOR A VARIABLE SPEED FAN DEVICE

BACKGROUND OF THE INVENTION

The present invention generally relates to variable speed fan user control interfaces. More particularly, the present invention relates to control interfaces adapted to communicate an operational status of a variable speed fan device and/or communicate manners of operating the variable speed fan device to a user.

Variable speed fan devices include various portable air treatment systems for use in filtering or otherwise treating air in closed environments. These air treatment systems can assume a variety of forms, and generally include a housing maintaining a motorized fan blade, e.g., an impeller, along with a filter. The filter is often either a media filter or an electrostatic precipitator, for example. The motorized fan blade directs room air through the filtering mechanism to treat air by removing various contaminants, such as particles, dust, pollen, odors, and others. The treated air is then directed back into the environment in which the device is located. Variable speed fans may be designed to perform other or additional functions (e.g., dehumidification, heating, cooling, and others). Where air filtering functionality is provided, the variable speed fan typically provides a user with the ability to remove and replace the associated media filter, clean the associated electrostatic precipitator, or otherwise refresh the filter. With this approach, then, regardless of an exact form of the filter (e.g., HEPA filters, multi-layered filters, pleated filters, electrostatic precipitators, and others) upon partial or full saturation or loading of the filter with room air contaminants, the filter is replaced, cleaned, or other appropriate maintenance is performed.

Control interfaces for communicating and controlling an operational status of variable speed fans typically include printed indicia to communicate to a user what the operational status of the variable speed fan is and/or how to modify the operational status of the variable speed fan. For example, control interfaces may include wording such as "on" and "off" in association with a power button or display means, thus indicating that the variable speed fan is in a power "on" or "off" operational state and that the power button is operated to transition the variable speed fan device between the power "on" and "off" states. Alternatively, symbols commonly used to designate a power button, such as a circle with a vertical line protruding from the top are also often employed as printed indicia. As another example, control interfaces may include wording such as "low," "medium," and "high," or variations thereof (e.g., "lo," "med," and "hi") associated with a fan speed actuator or display means indicating that the variable speed fan device is operating at a particular fan speed. It should be understood that other printed indicia providing explicitly understood instructions for operating variable speed fan devices or indicating an operational status of such variable speed fan devices are also existent.

SUMMARY OF THE INVENTION

One aspect of the present invention relates to a variable speed fan device. The device includes a housing, a motor, a fan blade, a controller, and a first plurality of discrete light sources. The motor is maintained by the housing and the fan blade is connected to the motor. The controller is electronically coupled to the motor and manages an operational status of the variable speed fan device. The display panel is assembled to the housing so as to define an exterior face that is visible from an exterior of the housing. The first plurality of discrete light sources are adapted to emit light from the display panel along a discontinuous perimeter at the exterior face. In an activated state, the light emitted by each light source is visually perceptible at the exterior face with each light source being electronically coupled to the controller such that the controller controls activation and deactivation of the light sources individually. In particular, the controller is programmed to individually activate and deactivate the first plurality of light sources in a predetermined pattern creating a perception of movement of light about the discontinuous perimeter at the exterior face of the display panel corresponding with an operational status of the variable speed fan device.

Another aspect of the present invention relates to a method of communicating an operational status of a variable speed fan device to a user. A variable speed fan device is provided, the device including a motor, a fan blade, a controller, and a display panel. The display panel maintains a first plurality of discrete light sources configured to emit light in an activated state. The emitted light is visually perceptible from a display surface of the display panel at a plurality of light emission areas disposed along a perimeter. The motor is operated to rotate the fan blade. Additionally, an appearance of movement of light about the plurality of light emission areas is generated by emitting light with the first plurality light sources in a predetermined pattern to communicate an operational status of the variable speed fan.

DETAILED DESCRIPTION OF THE PREFERRED EMBODIMENTS

Figure 1:
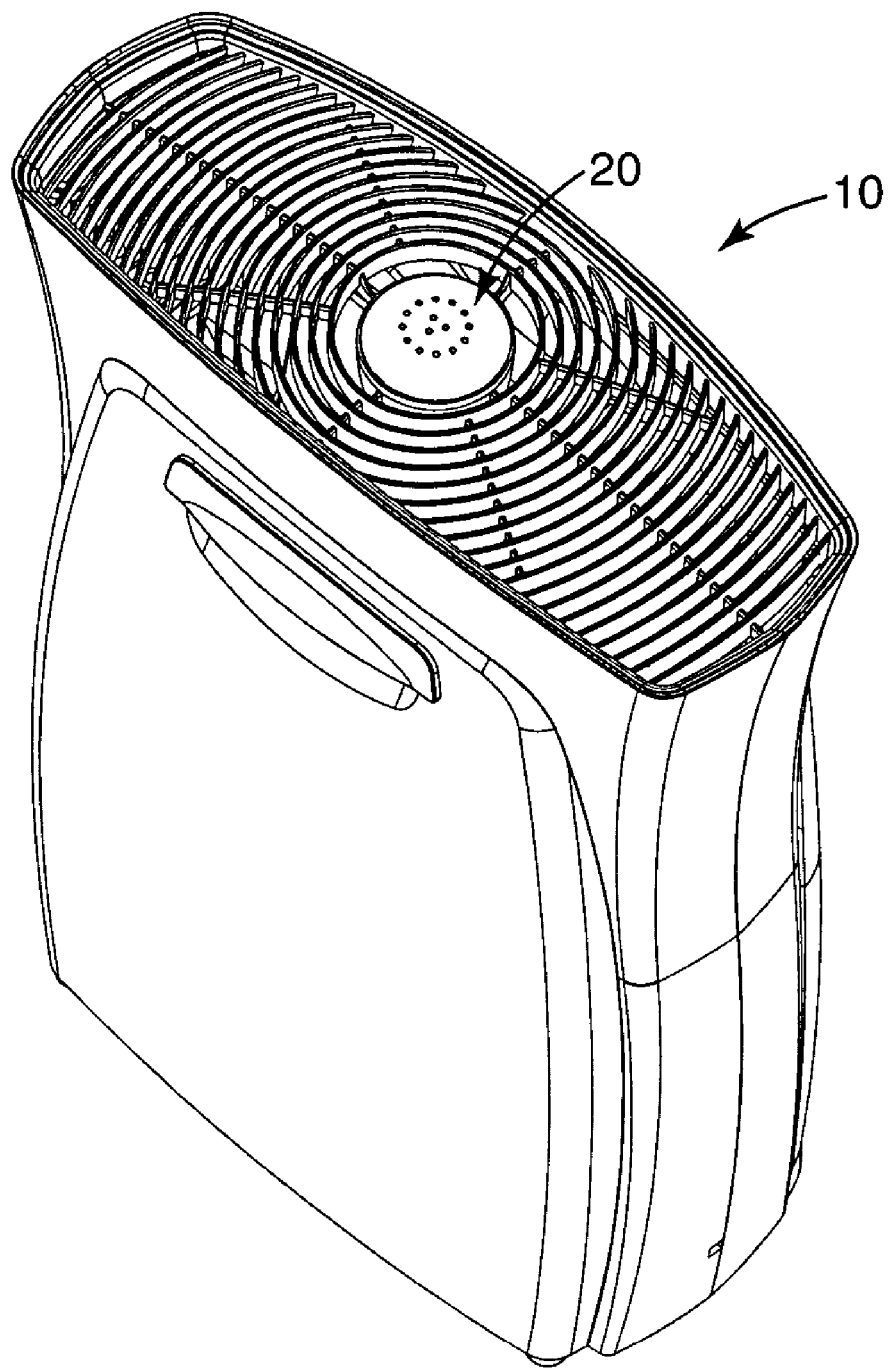
FIG. 1 is a perspective view of a variable speed fan device, in accordance with principles of the present invention.

Aspects of the present invention relate to variable speed fan devices, and in particular to control interfaces of variable speed fan devices. With this in mind, FIG. 1 illustrates a perspective view of a variable speed fan device 10 with which the present invention is useful. In general terms, the variable speed fan device 10 includes a control interface 20 optionally adapted for one or more of the following: to communicate an operational status of the variable speed fan device 10; to communicate a manner of operating the variable speed fan device 10; to control the operational status of the variable speed fan device 10; to perform diagnostics on the variable speed fan device 10 relating to the operational status of the variable speed fan device 10; to communicate a diagnostics result; and/or others. The variable speed fan device 10 can assume a wide variety of forms, and is optionally adapted for the following: treating or filtering room air, such as purifying room air; dehumidifying room air; deionizing room air; and/or others. Additionally, the variable speed fan device 10 is optionally sized to be substantially portable (e.g., able to be carried or moved manually by an adult) and operated in a living or working environment, for example in a home or office.

Figure 2:
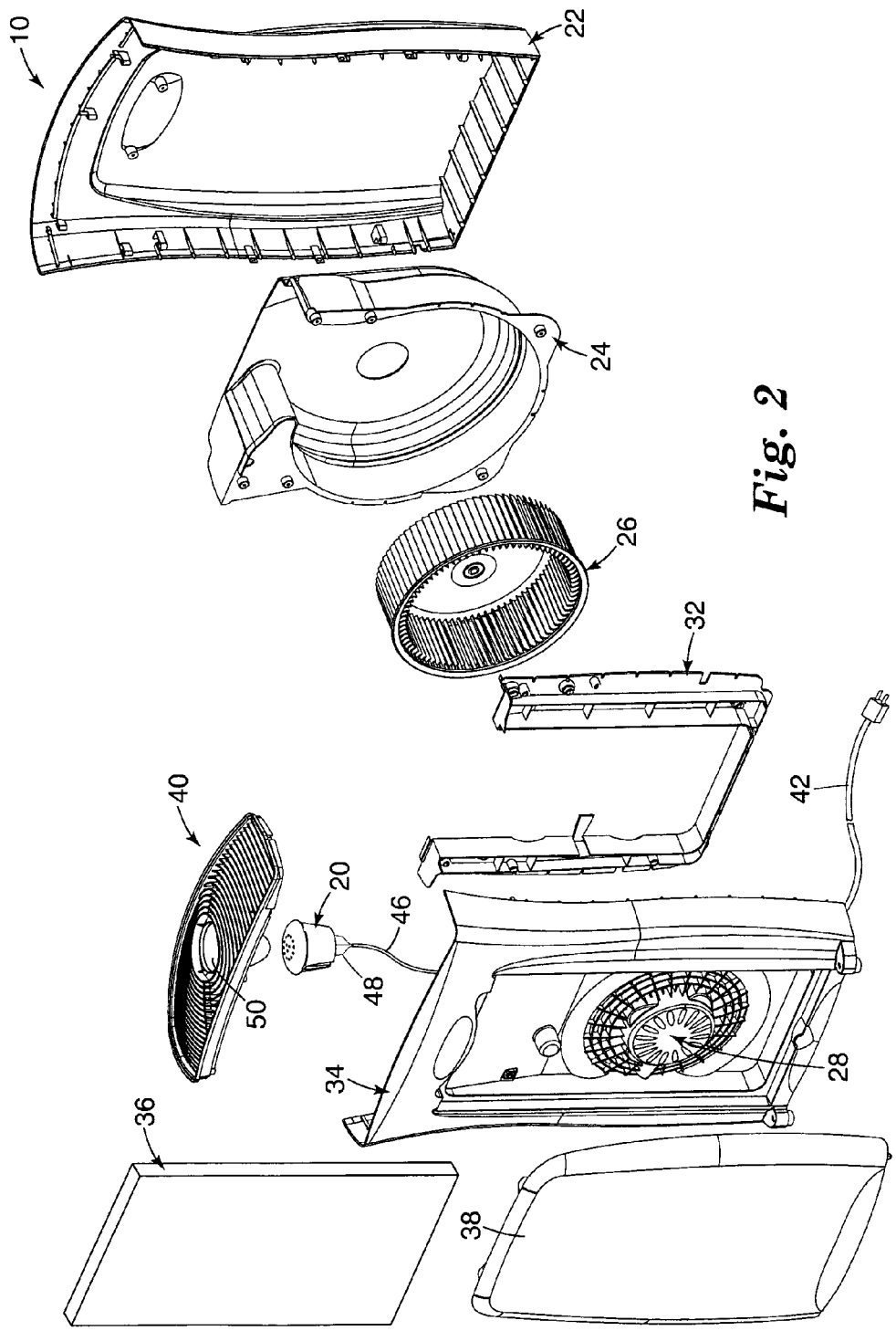
FIG. 2 is an exploded, perspective view of the variable speed fan device of FIG. 1.

FIG. 2 illustrates the variable speed fan device 10 from a perspective, exploded view. The variable speed fan device 10 generally includes the control interface 20, a rear housing 22, a scroll 24, a fan blade 26, a motor 28, a plenum plate 32, a front housing 34, a filter 36, a filter cover 38, an outlet grill 40, and a power cord 42. More discussion of the various components is provided below. In brief, the rear housing 22, the scroll 24, the plenum plate 32, the front housing 34, and the filter cover 38 house or otherwise maintain the fan blade 26, the motor 28, the filter 36, and the outlet grill 40. In turn, the outlet grill 40 houses or otherwise maintains the control interface 20. In operation, the control interface 20 is adapted to manage operation of the variable speed fan device 10, including communicating, controlling, communicating a manner of controlling, performing diagnostics, and/or communicating diagnostics results relating to the operational status of the variable speed fan device 10.

For example, the control interface 20 optionally intuitively communicates to a user how to modify fan speed, receives an input signal corresponding to a modified fan speed, controls the motor 28 to turn the fan blade 26 to draw air through the filter 36 and out of the outlet grill 40 at the modified fan speed, and intuitively communicates to the user that the variable speed fan device 10 is operating at the modified fan speed, all without printed indicia indicative of operation and/or the operational status of the variable speed fan device 10, including, for example, an absence of printed words or phrases, physically associated with a portion of the control interface 20 viewed by the user during operation.

In one embodiment, the variable speed fan device 10 is assembled as follows. The rear housing 22 receives the scroll 24. In turn, the scroll 24 receives the fan blade 26 in such a manner that the fan blade 26 is able to rotate within the scroll 24. For example, the fan blade 26 is optionally an impeller sized and shaped to fit within the scroll 24. The motor 28 is mechanically connected to the fan blade 26 and is adapted to rotate the fan blade 26. The motor 28 also includes a connector 46, which is optionally adapted to provide an electrical path for conveying power and a control signal, for example. The motor 28 is a variable speed motor adapted to rotate the fan blade 26 at different rates of rotation, or fan speeds, if desired. The motor 28 is optionally partially or entirely received within the fan blade 26.

In one embodiment, the plenum plate 32 is disposed over the fan blade 26 and assembled to the scroll 24. In turn, the front housing 34 maintains the motor 28 and is disposed over the assembled plenum plate 32 and scroll 24. The front housing 34 is assembled to the rear housing 22 to enclose the scroll 24, the fan blade 26, and the plenum plate 32. The filter 36 is designated generically in FIG. 2 as a box and is optionally an electrostatic precipitator, a media filter such as a pleated filter and/or a HEPA filter, or another filtering mechanism. The filter 36 is removably received within the front housing 34. The filter 36 optionally has a usefulness status based upon a number of particles that the filter 36 is maintaining, also described as a degree of filter saturation. For example, as the filter 36 maintains more and more particles over time, efficiency of the filter 36 in removing additional particles from the air and/or an ability of the variable speed fan device 10 to draw air through the filter 36 are reduced.

The filter cover 38 is assembled over the filter 36 and to the front housing 34. The control interface 20 includes a connector 48 adapted to mate with the connector 46 of the motor 28 to provide an electrical connection between the controller 58 and the motor 28, including, for example, an electrical pathway for conveying power to the control interface 20 and an electrical pathway for communicating a control signal between the control interface 20 and the motor 28 and/or other components. The power cord 42 is optionally connected to the motor 28 or other appropriate power station to provide power to the variable speed fan device 10, including, for example, the motor 28 and the controller 58. However, it should be understood that other means for powering the variable speed fan device 10 are also contemplated, for example, batteries or solar power.

In one embodiment, the outlet grill 40 has a central housing 50 (FIG. 3). The outlet grill 40 is optionally mounted in an open end (not shown) of the rear housing 22 and the front housing 34 assembly. In turn, the control interface 20 is mounted in the central housing 50 of the outlet grill 40, as will be described in greater detail below. In one embodiment, the central housing 50 is substantially egg-shaped and is adapted to receive the control interface 20.

Figure 3A:
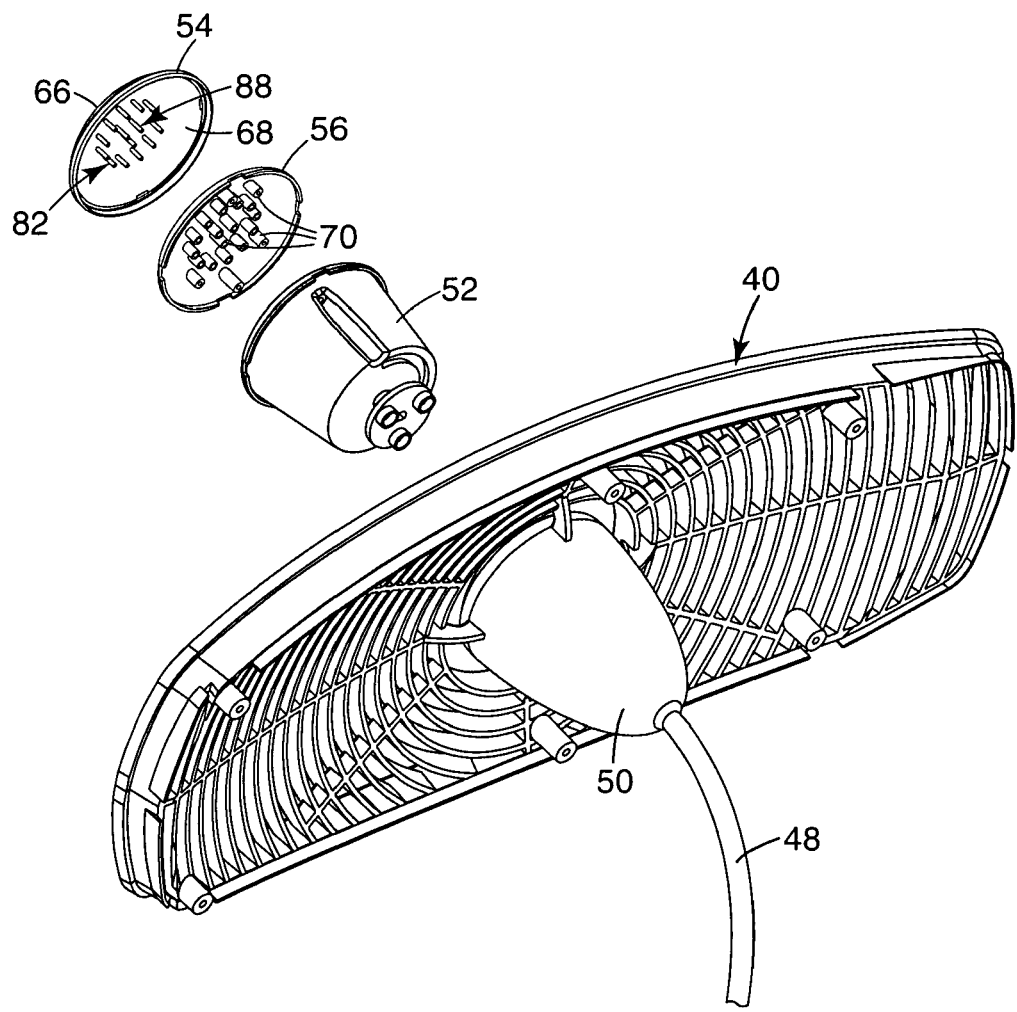
FIG. 3A is an exploded, perspective back view of an outlet grill and various components of a control interface of the variable speed fan device of FIG. 1.
Figure 3B:
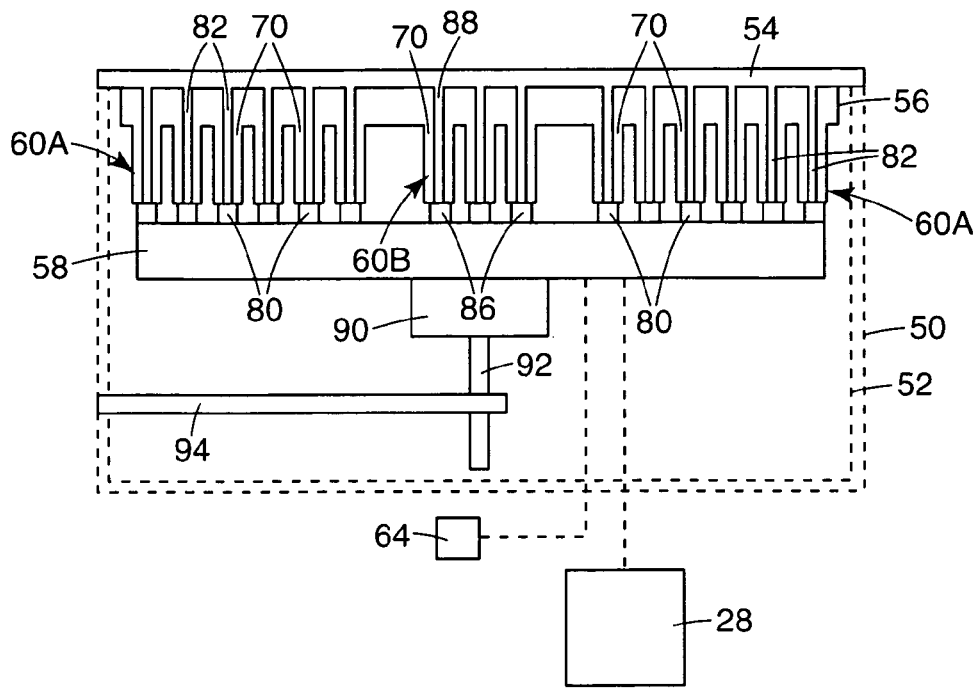
FIG. 3B is a schematic view of various components of the variable speed fan device of FIG. 1.

With reference to FIGS. 3A and 3B, the control interface 20 is described in greater detail. FIG. 3A illustrates the outlet grill 40, including the central housing 50, and various components of the control interface 20 from a perspective, back view. FIG. 3B illustrates various components of the variable speed fan device 10, as well as various relationships between such components, in schematic form. In one embodiment, the control interface 20 optionally includes a controller housing 52, a display panel 54, a shield 56, a controller 58, a first plurality of discrete light sources 60A, a second plurality of discrete light sources 60B, a rotation assembly 62, and a filter sensor 64.

In one embodiment, the filter cover 52 is adapted to be received within the central housing 50. The filter cover 52 is also adapted to receive the controller 58 and to be secured to the display panel 54 and the shield 56.

In one embodiment, the display panel 54 is formed of plastic and defines a display surface 66 and a back face 68 opposite the display surface 66. The display panel 54 is optionally substantially transparent, substantially semi-transparent, or is otherwise adapted to allow light to be emitted through the display panel 54 to be visually perceived, or viewed, by a user from the display surface 66. The display panel 54 is optionally substantially non-planar, or is otherwise three-dimensional in shape. For example, the display panel 54 is optionally substantially dome-shaped, although other shapes, such as pyramid-shaped, for example, are also contemplated. The display panel 54, and in particular the display surface 66 is free of printed indicia, including, for example, printed words or phrases providing information indicating a manner of operation and/or an operational status of the variable speed fan device 10. In one embodiment, the display surface 66 is free of any recognizable wording, phrases, or numbers relating to operation or the operational status of the variable speed fan device 10, including, for example LCD generated words, phrases, or numbers.

In one embodiment, the shield 56 is adapted to form a substantially complementary fit with the display panel 54 and can also be formed of plastic. The shield 56 optionally forms a plurality of collars 70. The plurality of collars 70 are adapted to receive the first and second pluralities of light sources 60A, 60B in order to help prevent introduction of stray light into the first and second pluralities of light sources 60A, 60B.

In one embodiment, the controller 58 includes an electronics substrate, such as a printed circuit board, maintaining a microprocessor and/or other circuitry. The controller 58 is optionally adapted to generate and receive various signals for controlling the operational status, diagnosing the operational status, and/or communicating the operational status of the variable speed fan device 10, or other information related to the variable speed fan device 10, by electronically communicating with various components of the variable speed fan device 10.

For example, the controller 58 is optionally adapted to place the variable speed fan device 10 into a diagnostics mode; facilitate communication to the user that the variable speed fan device 10 is in the diagnostics mode; diagnose, or determine, the operational status of the variable speed fan device 10; and communicate the diagnosis result for the operational status of the variable speed fan device 10. In one embodiment, the controller 58 is electronically coupled to the first and second pluralities of light sources 60A, 60B, the motor 28, and the filter sensor 64, as well as other components as desired.

The first plurality of light sources 60A optionally include a first plurality of emitters 80, for example twelve emitters 80, and a corresponding first plurality of light tubes 82. Each of the first plurality of emitters 80 is optionally a light emitting diode (LED). The LEDs can be various colors, sizes, and/or capable of emitting light at various intensities, for example. The plurality of light sources 60A are discrete, maintained by, and in individual electrical communication with the controller 58 such that each of the plurality of light sources 60A is optionally individually activated or deactivated by the controller 58. Each of the first plurality of emitters 80 is optionally substantially similar in light emission capabilities, although varying the capabilities of the plurality of emitters 80 is also contemplated. In one embodiment, the first plurality of emitters 80 are spaced apart about the controller 58 to define a circular, discontinuous perimeter. The perimeter is generally described as discontinuous where each of the plurality of emitters 80 is discrete and spaced apart from an adjacent emitter 80 such that an arrangement of the first plurality of emitters 80 defines a closed, but segmented ring of a desired shape, for example circular-shaped.

Each of the first plurality of light tubes 82 is optionally adapted to transmit emitted light from the first plurality of emitters 80 to the display panel 54. The first plurality of light tubes 82 are connected to, and in optical communication with, the back face 68 of the display panel 54. Each of the first plurality of light tubes 82 is optionally substantially cylindrical having a substantially circular transverse cross-section. However, it should be understood that various other transverse cross-sections are also contemplated, including, for example, star-shaped, square, triangular, or other shapes selected to transmit light to the display surface 66 with a desired pattern. In one embodiment, each of the first plurality of light tubes 82 is substantially continuously formed with the display panel 54. Additionally, the first plurality of light tubes 82 are optionally arranged relative to one other to define a circular, discontinuous perimeter about the back face 68 of the display panel 54. For example, the first plurality of light tubes 82 are optionally positioned at the back face 68 in a substantially complementary manner to the first plurality of emitters 80 as disposed about the controller 58.

In one embodiment, the second plurality of light sources 60B include a second plurality of emitters 86, for example three emitters 86 and a second plurality of light tubes 88 corresponding to the second plurality of emitters 86. Each of the second plurality of emitters 86 is optionally an LED. The LEDs are optionally various colors, sizes, and/or capable of emitting light at various intensities. For example, each of the second plurality of emitters 86 is optionally adapted to emit a different color light to be viewed by a user. The second plurality of emitters 86 are optionally separately maintained by, and in electrical communication with, the controller 58, such that each of the second plurality of emitters 86 are able to be individually activated and deactivated with the controller 58. Additionally, the second plurality of emitters 86 is optionally arranged relative to each other to define a discontinuous perimeter as maintained by the controller 58. In one embodiment, the second plurality of emitters 86 defines a triangular perimeter disposed inside of the perimeter of the first plurality of emitters 80.

In one embodiment, the second plurality of light tubes 88 are connected to, and in optical communication with, the back face 68 of the display panel 54. For example, the second plurality of light tubes 88 are optionally substantially continuously formed with the display panel 54. Additionally, the second plurality of light tubes 88 are optionally arranged relative to one other to define a discontinuous perimeter about the back face 68 of the display panel 54. For example, the second plurality of light tubes 88 are optionally positioned at the back face 68 in a substantially complementary manner to the second plurality of emitters 86 as disposed about the controller 58. In one embodiment, the second plurality of light tubes 88 operate and/or include features that are substantially similar to the first plurality of light tubes 82.

In one embodiment, the rotation assembly 62 includes a variable switch 90, an axle 92, and an axle guide 94. In one embodiment, the variable switch 90 is optionally adapted to be rotated to provide distinct output signals corresponding to a plurality of distinct, or discrete, positions, with the variable switch 90 being predisposed to reside at one of the distinct positions. In other words, the variable switch 90 will "click" into place or otherwise toggle into the distinct positions as the variable switch 90 is rotated to the various distinct positions. Alternately, the variable switch 90 is adapted to provide a continuously varying output signal as the variable switch 90 is rotated through various positions. For example, the variable speed switch 90 is optionally adapted to be rotated to provide a continuously and linearly changing output signal ranging from no signal to full signal at various positions.

In one embodiment, the axle 92 is an elongate rod adapted to be connected to the variable switch 90 such that the variable switch 90 is able to rotate relative to the axle 92 to select a desired output signal from the variable switch 90. In turn, the axle guide 94 is adapted to be secured to the central housing 50 and the axle 92 such that the axle 92 does not rotate relative to the central housing 50.

The filter sensor 64 is generally adapted to provide information relating to the filter 36, including, for example, the usefulness status of the filter. In one embodiment, the filter sensor 64 is a pressure sensor positioned and adapted to measure a pressure drop across the filter 36 when the variable speed fan device 10 is being operated to draw air through the filter 36. For example, the filter sensor 64 optionally includes one or more silicon pressure sensors containing sensing elements comprising of piezoresistors disposed in a silicon diaphragm, although other sensors are also contemplated.

One embodiment assembly of the control interface 20 is described as follows. The axle guide 94 is disposed inside, and secured to, the central housing 50 with the axle 92 secured to the axle guide 94. The variable switch 90 is rotatably secured to the axle 92. Additionally, the variable switch 90 is connected to by the controller 58 and in electrical communication with the controller 58, with the controller 58 also disposed in the central housing 50. The variable switch 90 is electrically connected to, or in electronic communication with, the controller 58 such that the output signal from the variable switch 90 is receivable by the controller 58 with any necessary power for generating the output signal being provided to the variable switch 90.

In one embodiment, the shield 56 is disposed over the controller 58 with the plurality of collars 70 substantially aligned to, and optionally abutted against, the first and second pluralities of emitters 80, 86. The shield 56 is secured to the controller 58, for example via screws or other fasteners. In turn, the display panel 54 is disposed over the shield 56 with the first and second pluralities of light tubes 82, 88 received through the plurality of collars 70 and against the first and second pluralities of emitters 80, 86. The display surface 66 is disposed outwardly toward an exterior of the variable speed fan device 10 and is viewable by a user observing the variable speed fan device 10. Additionally, the display panel 54 is optionally secured to the shield 56, for example, via snap fit features, glues, or other fasteners. The controller 58 is optionally in electrical communication with the motor 28 and the filter sensor 64 as shown schematically in FIG. 3B, and other components if desired.

In one embodiment, the display panel 54, the shield 56, the controller 58, and the variable switch 90 are rotatable together relative to the central housing 50, for example, to act as an actuator or control knob capable of varying the output signal from the variable switch 90. In other words, the display panel 54 is maintained by the actuator or control knob and optionally serves as a part of the actuator or control knob. For example, the display panel 54, as maintained by the assembly of the shield 56, the controller 58, and the variable switch 90, is optionally grasped by a user and rotated relative to the central housing 50 to vary the output signal from the variable switch 90. In one embodiment, the actuator is activated to change the operational status of the variable speed fan device 10, for example, to change fan blade speed, to place the variable speed fan device 10 in a fan speed indication mode, and/or to place the variable speed fan device 10 in a diagnostics mode, for example.

As alluded to above, in one embodiment assembly, the first plurality of emitters 80 is in optical communication with the display surface 66 of the display panel 54 via the first plurality of light tubes 82. Light is optionally emitted from the display surface 66 at substantially opposite locations where the first plurality of light tubes 82 extend from the back face 68 of the display panel 54. In particular, activation of one or more of the first plurality of emitters 80 causes emitted light to be transmitted through the first plurality of light tubes 82 and through the display panel 54 to be externally viewable from the display surface 66. The plurality of collars 70 optionally help prevent stray light from entering, or exiting, each of the first plurality of light tubes 82.

In turn, the second plurality of emitters 86 is in optical communication with the display surface 66 of the display panel 54 via the second plurality of light tubes 88. Light is optionally emitted from the display surface 66 substantially opposite locations where the second plurality of light tubes 88 extend from the back face 68 of the display panel 54. In particular, activation of one or more of the second plurality of emitters 86 causes emitted light to be transmitted through the second plurality of light tubes 88 and through the display panel 54 to be externally viewable from the display surface 66. The plurality of collars 70 optionally help prevent stray light from entering, or exiting, each of the second plurality of light tubes 88. It should be noted that while the second plurality of emitters 86 are optionally adapted to emit different color lights relative to one another, it should also be understood that the display panel 54 and/or the second plurality of light tubes 88, for example, are optionally colored different colors to vary the color of emitted light viewed from the display surface 66.

Figure 4:
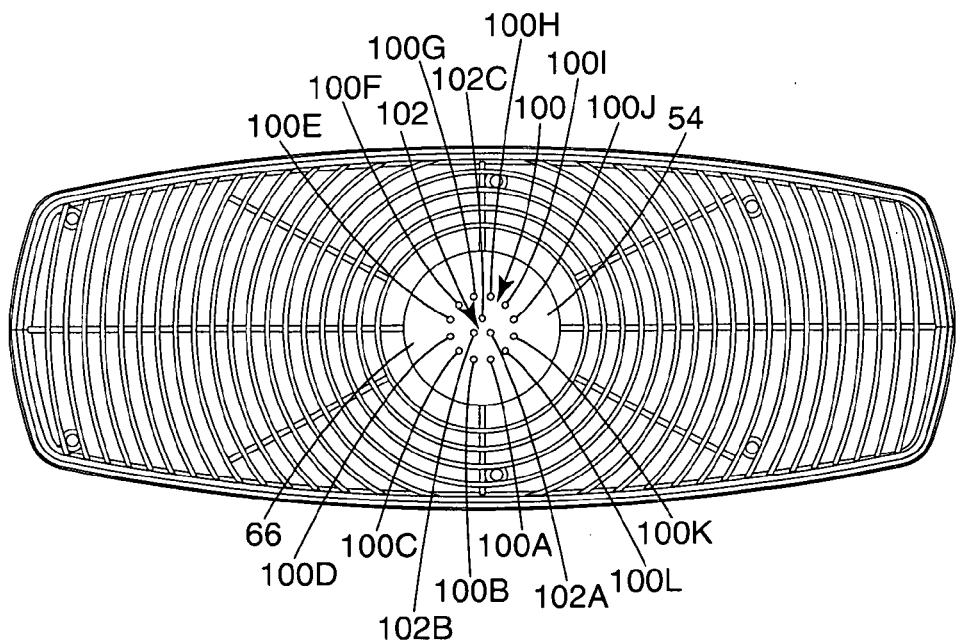
FIG. 4 is a top view of the variable speed fan device of FIG. 1.

FIG. 4 illustrates the variable speed fan device 10 from a top view. With reference to FIG. 4, an outer plurality of discrete light emission areas 100 corresponding to the first plurality of light sources 60A and an inner plurality of discrete light emission areas 102 corresponding to the second plurality of light sources 60B are designated generally by circles in FIG. 4. As referenced above, the controller 58 is adapted to individually activate or deactivate each of the first plurality of light sources 60A and each of the second plurality of light sources 60B to emit light viewable from the display surface 66. The outer and inner pluralities of light emission areas 100, 102 generally designate locations where light emitted from the first and second light sources 60A, 60B is viewable from the display surface 66.

In some embodiments, the circles representing the light emission areas 100, 102 are viewable regardless of whether a corresponding light source of the first and second pluralities of light sources 60A, 60B are activated. For example, the display panel 54 is optionally substantially transparent such that the first plurality of light sources 60A and/or the second plurality of light sources 60B are generally viewable through the display panel 54 regardless of whether they are in an activated or deactivated state. In other embodiments, for example where the display panel 54 is tinted or semi-transparent, the first and/or second pluralities of light sources 60A, 60B are not actually externally viewable, and a light emission area would only be defined to the user or other viewer when light is being emitted by a corresponding light source.

As referenced above, light tubes having transverse cross-sectional shapes other than circular are optionally employed. In this manner, a shape of a corresponding light emission area is optionally varied by selecting the transverse cross-sectional shape of one or more light tubes. For example, a triangular shaped light tube is optionally selected to produce a triangle-shaped light emission area. Additionally, the display panel 54 is optionally tinted or otherwise adapted to define a shape of one or more of the outer and inner pluralities of light emission areas 100, 102, including relatively crisp shapes having well defined edges or relatively blurred shapes as desired.

With the above in mind, the outer plurality of emission areas 100 optionally includes a first area 100A through a twelfth area 100L. Each of the first through twelfth areas 100A-100L corresponds to one of the first plurality of light sources 60A. In particular, the first plurality of light sources 60A are positioned relative to the display panel 54 such that the controller 58 can activate the first plurality of light sources 60A to emit light from the display panel 54 in a desired pattern. As shown, in one embodiment the outer plurality of emission areas 100 is disposed along a discontinuous outer perimeter 110 (FIG. 5) having a circular ring shape. For example, the first plurality of light sources 60A is optionally positioned such that each of the first through twelfth areas 100A-100L corresponds to a time on a face of a clock, i.e., one o'clock for an eighth area 100H, six o'clock for the first area 100A, and twelve o'clock for a seventh area 100G. However, other numbers and configurations of the outer plurality of emission areas 100 are also contemplated. Additionally, the first plurality of light sources 60A is optionally configured such that green light is emitted at each of the outer plurality of emission areas 100, although colors at each of the outer plurality of emission areas 100 are optionally varied as desired.

In one embodiment, the inner plurality of emission areas 102 includes a first area 102A, a second area 102B, and a third area 102C. Each of the first through third areas 102A-102C corresponds to one of the second plurality of light sources 60B. In particular, the second plurality of light sources 60B are positioned relative to the display panel 54 such that light is optionally emitted from the display panel 54 in a desired pattern. As shown, in one embodiment the inner plurality of emission areas 102 is disposed along a discontinuous inner perimeter 112 (FIG. 5) having a triangular ring shape. Additionally, the second plurality of light sources 60B are optionally configured such that the first area 102A corresponds to a green emitted light, the second area 102B corresponds to a red emitted light, and the third area 102C corresponds to a yellow emitted light, for example.

Figure 5:
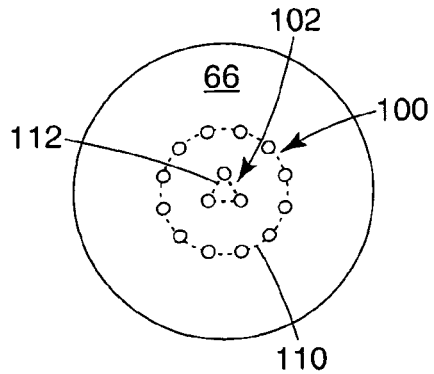
FIGS. 5-10 are top views of the control interface of FIGS. 3A and 3B illustrative of methods of using the control interface, in accordance with principles of the present invention.

With reference to FIG. 5, the outer perimeter 110 generally extends about the inner perimeter 112. As will be described in greater detail below, the first and second pluralities of light sources 60A, 60B are optionally individually activated and deactivated by the controller 58. For example, the first and second pluralities of light sources 60A, 60B are optionally individually activated/deactivated in order to generate a predetermined pattern of emitted light that creates a perception of movement of light about one or both of the inner and outer perimeters 110, 112, respectively, in order to intuitively communicate the operational status of the variable speed fan device 10 and/or a method of operating the variable speed fan device 10.

Figure 6:
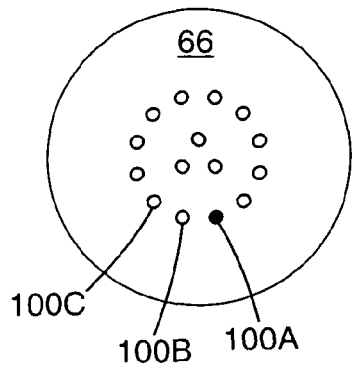

In one embodiment, the operational status of the variable speed fan device 10 includes the variable speed fan device 10 being in a powered state. For example, the variable speed fan device 10 is connected to a power source (not shown) to place the variable speed fan device 10 in the powered state. With reference to FIG. 6, in response to the variable speed fan device 10 being in the powered state, the controller 58 (FIG. 3B) determines that the variable speed fan device 10 is being powered and enters a power indication mode. In the power indication mode, the controller 58 optionally prompts selective activation of one of the first plurality lights sources 60A (FIG. 3B) on an individual basis in accordance with a power status display routine.

In particular, light is emitted in a predetermined pattern according to the power status display routine and perceived at one or more of the outer plurality of light emission areas 100, although light emission at one of the inner plurality of light emission areas 102 is also contemplated. The power status display routine optionally includes illuminating a first light source of the first plurality of light sources 60A corresponding to the first area 100A. For example, the first light source of the first plurality of light sources 60A is optionally illuminated at a continuous intensity or varying the emitted light intensity at a predetermined periodicity or rate.

In one embodiment, the first light source of the first plurality of light sources 60A is activated and deactivated at a relatively rapid rate, such substantially instantly, with a delay following deactivation, for example, to generate a blinking effect of emitted light at the first light area 100A. Alternately, emitted light intensity is optionally continuously varied as a function of time to produce a pulsing effect at the first area 100A. The pulsing effect is optionally a substantially quick pulse, or a relatively slow pulse, with a viewer perceiving the first area 100A as transitioning between intensities of illumination varying between a selected minimum light emission intensity, or brightness level, for example zero light emission, to a maximum light emission intensity at a predetermined periodicity. The periodicity of the transition between the minimum light emission to the maximum light emission is optionally selected to substantially correspond to an average resting heart rate of a male adult human, e.g., about 70 beats per minute. In one embodiment, continuous, pulsing, or blinking light emission perceived by a viewer at the first area 100A intuitively communicates to a user that the variable speed fan device 10 has an operational status including the variable speed fan device 10 being in a powered state. Additionally, or alternatively, the user is intuitively confirmed in a proper manner of providing the variable speed fan with power.

In one embodiment, the operational status of the variable speed fan device 10 includes fan speed. For example, the display panel 54 serves as part of a knob or actuator which is rotatable to transition the variable speed fan device 10 to a first fan speed setting. As referenced above, the variable switch 90 is optionally actuated by grasping and turning a portion of the display panel 54, for example to a first position, which sends a first output signal to the controller 58. In particular, the first output signal is optionally predetermined as being indicative of selection of the first fan speed. In turn, the controller 58 causes the motor 28 to turn the fan blade 26 at the first fan speed upon reception of the predetermined output signal from the variable switch 90 and enters a first fan speed indication mode.

Figure 7:
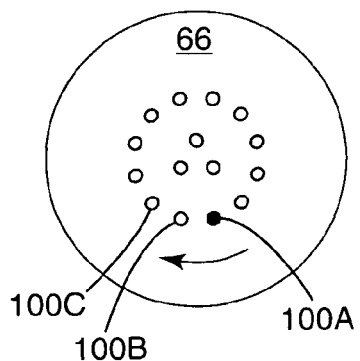

With reference to FIG. 7, the controller 58 optionally intuitively communicates to the user that the variable speed fan device 10 is operating at the first fan speed during the first fan speed indication mode by prompting selective activation and deactivation of the first plurality of light sources 60A on an individual basis in accordance with a first fan speed display routine. In one embodiment, the first fan speed display routine includes first plurality of light sources 60A being individually activated and deactivated in a predetermined pattern to generate an appearance of rotational movement of light about the outer perimeter 110 (FIG. 5).

For purposes of illustration, the first fan speed display routine optionally includes a first light source of the first plurality of light sources 60A being activated to emit visually perceivable light from the display surface 66 at the first area 100A. A second light source of the first plurality of light sources 60A is subsequently activated to emit visually perceivable light from the display surface 66 at the second area 100B. A third light source of the first plurality of light sources 60A is subsequently activated to the second light source to emit visually perceivable light from the display surface at the third area 100C. Subsequent light sources of the first plurality of light sources 60A are optionally activated to emit light at each of the outer plurality of light emission areas 100 such that a visual perception of rotational movement of light about the outer perimeter 110 in a clockwise direction, for example, is generated. This optionally continues for any desired number of passes about the outer perimeter 110 as desired, for example during an entire time the variable speed fan device 10 is operating at the first fan speed. In one embodiment, generation of a perception of rotational movement of light intuitively conveys the concept that the variable speed fan device 10 is operating at the first fan speed to the user. Additionally, in one embodiment, communicating that the variable speed fan device 10 is operating at the first fan speed intuitively communicates a proper manner of operating the variable speed fan device 10 at the first fan speed by confirming an effect of the user action of selecting the first fan speed.

In one embodiment, the first light source is deactivated substantially simultaneously with activation of the second light source, the second light source is deactivated substantially simultaneously with activation of the third light source, and so forth. In one embodiment, no more than a single light source is activated at any point in time. Alternatively, deactivation of each of the first plurality of light sources 60A is delayed, or each of the plurality of light sources is continuously reduced in intensity as a function of time during deactivation, such that a "comet effect" or tail of light having a varying brightness is produced behind a "leading" light source being activated. A "snake effect" is alternately accomplished with a tail of light of a desired length having a substantially continuous brightness.

In one embodiment, the first plurality of light sources 60A are optionally activated and deactivated with a desired timing in order to generate an appearance of rotational movement of light about the outer perimeter at a first rate. As will be described in greater detail below, the timing of activation/deactivation of the first plurality of light sources 60A is optionally varied according to fan speed as another means for conveying the operational status of the variable speed fan device 10, for example, a faster perceived rate of movement being indicative of a faster fan speed.

Additionally, the perception of movement of light need not correspond only to "lighted" areas moving about the outer plurality of light emission areas 100. Rather, the perceived movement of light optionally corresponds to a perception of "darkened" areas of the outer plurality of light emission areas 100 moving. For example, the first light source is optionally deactivated with remaining ones of the first plurality of light sources 60A emitting light at corresponding ones of the outer plurality of light emission areas 100. Then the second light source is deactivated with the first light source being activated, the third light source is deactivated with the second light source being activated, and so forth. Further, the second fan speed display routine begins or is otherwise initiated by emitting light at any of plurality of outer light emission areas 100 as desired.

In one embodiment, the operational status of the variable speed fan device 10 includes a second fan speed greater than the first fan speed. As referenced above, the variable switch 90 is optionally actuated by grasping and turning a portion of the display panel 54 to a second position, which sends a second output signal to the controller 58. The second output signal is optionally predetermined as being indicative of selection of the second fan speed. In turn, the controller 58 causes the motor 28 to rotate the fan blade 26 at the second fan speed upon reception of the predetermined output signal from the variable switch 90 and enters a second fan speed indication mode.

Figure 8:
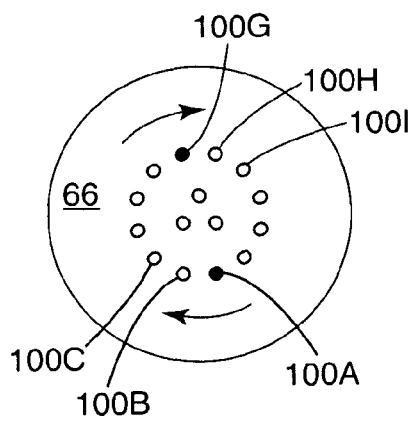

With reference to FIG. 8, the controller 58 optionally intuitively communicates to the user that the variable speed fan device 10 is operating at the second fan speed in the second fan speed indication mode by prompting selective activation and deactivation of the first plurality of light sources 60A on an individual basis in accordance with a second fan speed display routine. In one embodiment, the second fan speed display routine includes the first plurality of light sources 60A being individually activated and deactivated in a predetermined pattern to generate an appearance of rotational movement of light about the outer perimeter 110 (FIG. 5). A number of the plurality of light sources 60A, for example two, are optionally activated and deactivated substantially simultaneously at any point in time throughout the second fan speed display routine such that a perception of rotational movement of two different light areas about the outer perimeter 110 is accomplished.

For purposes of illustration, the second fan speed display routine optionally includes the first light source of the first plurality of light sources 60A being activated to emit visually perceivable light from the display surface 66 at the first area 100A. Substantially simultaneously, a seventh light source of the first plurality of light sources 60A is activated to emit visually perceivable light from the display surface 66 at the seventh area 100G. Then, the second light source of the first plurality of light sources 60A is subsequently activated to emit visually perceivable light from the display surface 66 at the second area 100B. Substantially simultaneously, an eighth light source of the first plurality of light sources 60A is activated to emit visually perceivable light from the display surface 66 at the eighth area 100H. Then, the third light source of the first plurality of light sources 60A is subsequently activated to the second light source to emit visually perceivable light from the display surface 66 at the third area 100C. Substantially simultaneously, a ninth light source of the first plurality of light sources 60A is activated to emit visually perceivable light from the display surface 66 at the ninth area 1001.

It should be understood subsequent light sources of the first plurality of light sources 60A are optionally activated with substantially simultaneous deactivation of a preceding light source in the manner previously described in association with the first fan speed display routine such that a visual perception of rotational movement of two areas of light about the outer perimeter 110 is generated, for example in the clockwise direction. This optionally continues for any desired number of passes about the outer perimeter 110 as desired, for example during an entire time the variable speed fan device 10 is operating at the second fan speed.

A total number of the first plurality of light sources 60A that are activated at any point in time when the variable speed fan device 10 is operating at the second fan speed is optionally greater than a total number of the first plurality of light sources 60A that are activated at any point in time when the variable speed fan device 10 is operating at the first fan speed. For example, light is optionally perceived as moving at two separate locations corresponding to opposite sides of the outer perimeter 110 at substantially the same rate. Along these lines, light is perceived at more locations when the variable speed fan device 10 is operating at the second fan speed in comparison to when the variable speed fan device 10 is operating at the first fan speed.

Activating a greater total number of the first plurality of light sources 60A when the variable speed fan device 10 is operating at the second fan speed in comparison to when the variable speed fan device 10 is operating at the first fan speed optionally intuitively communicates that the variable speed fan device 10 is operating at the second fan speed greater than the first fan speed. In other words, the viewer intuitively perceives more lighted areas as corresponding to a greater fan speed. For example, generation of a perception of substantially simultaneous rotational movement of light at a greater number of locations than when the variable speed fan device 10 is operating at the first fan speed optionally intuitively communicates that the variable speed fan device 10 is operating at the second fan speed greater than the first fan speed. In other words, the user intuitively perceives more locations of movement as corresponding to a greater fan speed.

In one embodiment, the second fan speed display routine includes the first plurality of light sources 60A being activated and deactivated in order to generate an appearance of rotational movement of light about the outer perimeter 110 at a second rate when the variable speed fan device 10 is operating at the second fan speed. For example, the second rate of perceived rotational movement is optionally substantially greater than the first rate of perceived rotational movement associated with the first fan speed display routine. A greater rate also optionally intuitively communicates to the user that the variable speed fan device 10 is operating at the second fan speed. Additionally, the manner of operating the variable speed fan device 10 to increase fan speed is intuitively communicated upon user recognition that the second fan speed is selected by turning the actuator, for example, by turning the actuator in substantially the same direction as the perceived rotational movement of light.

As referenced above in association with the first fan speed display routine, comet effects, perceived movement of groups of adjacent areas of the outer plurality of light emission areas 100, and generation of a perception of movement of light via perceived movement of darkened areas about the outer perimeter 110, or other variations are optionally employed by the second fan speed display routine as desired. Additionally, it should be understood that the second fan speed display routine optionally begins or is otherwise initiated at any of plurality of outer light emission areas 100.

In one embodiment, the operational status of the variable speed fan device 10 includes a third fan speed greater than both the first and second fan speeds. The variable switch 90 is optionally actuated to a third position, which sends a third output signal to the controller 58. The third output signal is optionally predetermined as being indicative of selection of the third fan speed. In turn, the controller 58 causes the motor 28 to rotate the fan blade 26 at the third fan speed upon reception of the predetermined output signal from the variable switch 90 and enters a third fan speed indication mode.

Figure 9:
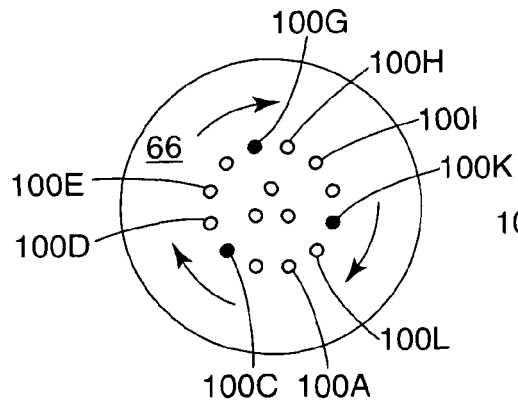

With reference to FIG. 9, the controller 58 optionally intuitively communicates to the user that the variable speed fan device 10 is operating at the third fan speed during the third fan speed indication mode by prompting selective activation and deactivation of the first plurality of light sources 60A on an individual basis in accordance with a third fan speed display routine. In one embodiment, the third fan speed display routine includes the first plurality of light sources 60A being individually activated and deactivated in a predetermined pattern to generate an appearance of rotational movement of light about the outer perimeter 110. For example, a number of the plurality of light sources 60A, for example three, are optionally activated and deactivated substantially simultaneously throughout the third fan speed display routine such that a perception of rotational movement of light of three different areas about the outer perimeter 110 is accomplished.

For purposes of illustration, the third fan speed display routine optionally includes emitting light substantially simultaneously at the third area 100C, the seventh area 100G, and the eleventh area 100K with the first plurality of light sources 60A. Then, light is next emitted substantially simultaneously at the fourth area 100D, the eighth area 100H, and the twelfth 100L area. Subsequently, light is substantially simultaneously emitted at the fifth area 100E, the ninth area 100I, and the first area 100A. A similar progression optionally continues such that a visual perception of rotational movement of three areas of light about the outer perimeter 110 at any point in time is generated. This optionally continues for any desired number of passes about the outer perimeter 110 as desired, for example during an entire time the variable speed fan device 10 is operating at the third fan speed. Additionally, and as referenced above in association with the first and second fan speed display routines, there is optionally substantially simultaneous deactivation of light sources preceding "leading" light sources as they are activated to emit light.

In one embodiment, a greater total number of the first plurality of light sources 60A are activated when the variable speed fan device 10 is operating at the third fan speed in comparison to when the variable speed fan device 10 is operating at either of the first or second fan speeds. This optionally intuitively communicates that the variable speed fan device 10 is operating at the third fan speed, which is greater than either of the first or second fan speeds. In other words, the viewer intuitively perceives more lighted areas as corresponding to a greater fan speed. For example, generation of a perception of substantially simultaneous rotational movement of light at a greater number of locations than when the variable speed fan device 10 is operating at either of the first or second fan speeds optionally intuitively communicates that the variable speed fan device 10 is operating at the third fan speed greater than either of the first or second fan speeds. In other words, the user intuitively perceives more locations of movement as corresponding to a greater fan speed. For example, movement of light is optionally perceived at substantially the same time at three separate locations at any point in time during the third fan speed display routine in comparison to two separate locations at any point in time during the second fan speed display routine and one location at any point in time during the first fan speed display routine.

In one embodiment, the third fan speed display routine includes the first plurality of light sources 60A being activated and deactivated in order to generate an appearance of rotational movement of light about the outer perimeter 110 at a third rate when the variable speed fan device 10 is operating at the third fan speed. For example, the third rate of perceived rotational movement is optionally substantially greater than either of the first or second rates of perceived rotational movement associated with the first and second fan speed display routines. A greater rate of perceived rotational movement optionally intuitively communicates that the third speed setting, corresponds to a greater fan speed than either of the first and second fan speed settings. Additionally, the manner of operating the variable speed fan device 10 to increase fan speed is intuitively communicated upon user recognition that the third fan speed is selected by turning the actuator, for example by turning the actuator in substantially the same direction as the perceived rotational movement of light.

As referenced above in association with the first fan speed display routine, comet effects, perceived movement of groups of adjacent areas of the outer plurality of light emission areas 100, and generation of a perception of movement of light via perceived movement of darkened areas about the outer perimeter 110, or other variations are optionally employed by the third fan speed display routine as desired. Additionally, it should be understood that the third fan speed display routine begins or is otherwise initiated at any of the plurality of outer light emission areas 100 as desired.

In one embodiment, the operational status of the variable speed fan device 10 includes the variable speed fan device 10 entering various diagnostics modes. For example, one diagnostic mode includes determining the usefulness status of the filter 36. A diagnostics check for the filter 36 is optionally automatically performed upon turning the variable switch 90 to the third position. In particular, the third output signal is optionally predetermined as being indicative of selection of the third fan speed and an automatic diagnostics check. Although, it should be understood that in one embodiment, the variable switch 90 is turned to a fourth position to initiate a diagnostics check. Once a diagnostics check is indicated, the controller 58 places the variable speed fan device 10 into the diagnostics mode, begins a diagnostics display routine, and causes the motor 28 to turn the fan blade 26 at a diagnostics fan speed, for example, the third fan speed.

In one embodiment, the controller 58 optionally performs a diagnostics check on the filter 36 to determine the usefulness status of the filter according to the following. The controller 58 communicates with the filter sensor 64 to determine the usefulness status, for example by measuring a pressure drop across the filter 36 while the fan is being turned at the diagnostics fan speed. The controller 58 evaluates the usefulness status, for example, by using a pre-stored value for various acceptable or less acceptable pressure drops, or using other criteria, to determine whether the pressure drop across the filter 36 is indicative of the filter 36 needing replacement, cleaning, or other maintenance. The controller 58 optionally evaluates whether the usefulness status of the filter 36 falls into one of three categories: Good (an acceptable time remaining before filter maintenance is recommended); Cautionary (filter operation acceptable, but a need for maintenance is imminent); and Bad (filter is performing at an unacceptable or otherwise undesirable level).

Figure 10:
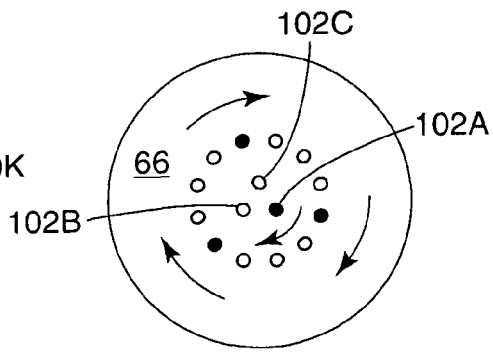

With reference to FIG. 10, the controller 58 optionally intuitively communicates to the user that the variable speed fan device 10 is in the filter diagnostics mode by prompting selective activation and deactivation of the second plurality of light sources 60B on an individual basis in accordance with a diagnostics display routine. Additionally, the controller 58 optionally prompts activation and deactivation of the first plurality of light sources 60A to communicate that the fan is operating at the diagnostics fan speed. For example, where the diagnostics fan speed is substantially the same as the third fan speed, the controller 58 optionally communicates the fan speed according to the third fan speed display routine.

In one embodiment, the diagnostics display routine includes the second plurality of light sources 60B being individually activated and deactivated in a predetermined pattern to generate an appearance of movement of light about the inner perimeter 112. For purposes of illustration, the diagnostics display routine optionally includes a first light source of the second plurality of light sources 60B being activated to emit visually perceivable light from the display surface 66 at the first area 102A. A second light source of the second plurality of light sources 60B is subsequently activated to emit visually perceivable light from the display surface 66 at the second area 102B. A third light source of the second plurality of light sources 60B is subsequently activated to the second light source to emit visually perceivable light from the display surface 66 at the third area 102C. From this, a visual perception of movement of light, for example in the clockwise direction, about the outer perimeter 110 is optionally generated and continues for any desired number of passes about the outer perimeter 110, for example, for a pre-selected time or while the variable speed fan device 10 is determining the usefulness status of the filter 36.

In one embodiment, the first light source is deactivated substantially simultaneously with activation of the second light source, the second light source is deactivated substantially simultaneously with activation of the third light source, and so forth. Alternatively, deactivation of each of the first plurality of light sources 60A is delayed, or each of the plurality of light sources is continuously reduced in intensity as a function of time during deactivation, such that a "comet effect" or a tail of light is produced behind a light source being activated. Further, the first plurality of light sources 60A are optionally activated and deactivated with a desired timing in order to generate an appearance of rotational movement of light about the outer perimeter at a pre-selected rate.

As noted with other routines, the perception of movement of light need not correspond to the "lighted" areas of the outer plurality of light emission areas 100 moving. Rather, the perceived movement of light optionally corresponds to "darkened" areas of the outer plurality of light emission areas 100 moving. For example, the first light source is optionally deactivated with remaining ones of the second plurality of light sources 60B emitting light at corresponding ones of the inner plurality of light emission areas 102. Then the second light source is deactivated with the first light source being activated, the third light source is deactivated with the second light source being activated, and so forth. It should also be understood that the diagnostics display routine begins or is otherwise initiated at any of plurality of inner light emission areas 102 as desired.

In one embodiment, the control interface 20 is adapted such that a different color light is presented at each of the first, second and third areas 102A, 102B, 102C. For example, each of the second plurality of light sources 60B is optionally adapted to emit a different color light, for example green, yellow, and red, such that a green emitted light is visible from the display surface 66 at the first area 102A, a red emitted light is visible from the display surface 66 at the second area 102B, and a yellow emitted light is visible from the display surface 66 at the third area 102C. The perceived movement and/or use of colors associated with "Good," "Cautionary," and "Bad" optionally intuitively indicates that the variable speed fan device 10 is in the diagnostics mode. For example, the user optionally intuitively understands that the variable speed fan device 10 is "cycling" through "Good," "Cautionary," and "Bad" during diagnosis.

In one embodiment, upon a determination of the usefulness status of the filter, the controller optionally causes one of the second plurality of light sources 60C to be activated and deactivates any of the remaining light sources that were activated. In one embodiment, where the usefulness status is determined to be "Good," the controller prompts emission of the green emitted light at the first area 100A. The light source of the second plurality of light sources 60B corresponding to the green emitted light is optionally prompted by the controller 58 to remain continuously activated for a sustained period of time, for example, about five minutes. In one embodiment, the continuously sustained, green light is intuitively communicative that the diagnostics have produced a good result, for example that the usefulness status of the filter 36 is acceptable or good. For example, the user optionally intuitively perceives that sustained "green" means "Good." Alternately, the controller 58 optionally prompts activation of the light source to activate and deactivate such that the green emitted light blinks, pulses, or is characterized by other effects.

In one embodiment, where the usefulness status is determined to be "Cautionary," the controller 58 prompts emission of the yellow emitted light at the third area 100C. The light source of the second plurality of light sources 60B corresponding to the yellow emitted light is optionally prompted by the controller 58 to pulse slowly for a sustained period of time, for example, about five minutes. In one embodiment, the slowly pulsing, yellow light is intuitively communicative that the diagnostics have produced a cautionary result, for example that filter 36 maintenance, e.g., replacement, cleaning, or other maintenance, should occur soon. In other words, slowly pulsing yellow is optionally intuitively perceived by the user to mean caution. Alternately, the controller 58 optionally prompts the light source to activate over a sustained period of time or to activate and deactivate such that the yellow emitted light blinks or is characterized by other effects.

In one embodiment, where the usefulness status is determined to be "Bad," the controller 58 prompts emission of the red emitted light at the second area 100B. The light source of the second plurality of light sources 60B corresponding to the red emitted light is optionally prompted by the controller 58 to blink rapidly for a sustained period of time, for example, until the fan speed is reduced or otherwise changed. In one embodiment, the rapidly blinking, red light is intuitively communicative that the diagnostics have produced in a negative result, for example that the filter usefulness status is unacceptable. In other words, rapidly blinking red is optionally intuitively perceived by the user as indicative of a need to take immediate action. Alternately, the controller 58 optionally prompts the light source to activate over a sustained period of time or to activate and deactivate such that the red emitted light pulses or is characterized by other effects.

In view of the above, embodiment methods and devices for intuitively communicating an operational status of variable speed fans are provided. Intuitive communicative aspects of the control interface 20, according to principles of the present invention, are optionally accomplished via a variety of mechanisms. For example, intuitive communicative aspects of the control interface 20 are optionally accomplished through past experience with the variable speed fan device 10, e.g., each time the variable speed fan device 10 is plugged in, the user observes a predetermined pattern of emitted light and at some point intuitively associates the occurrences. The intuitive communicative aspects are also optionally accomplished through past experience with other devices or displays including intuitively associating a predetermined pattern with an operational status according to similar past experiences unrelated to the variable speed fan device 10. The intuitive communicative aspects are also optionally accomplished via rudimentary associative reasoning, e.g., perceived rotational movement intuitively representing rotational movement of the fan blade 26 or a perceived increase in rotational movement corresponding to an increase in fan speed.

Such intuitive communication is advantageous in many respects. For example, operation and the operational status of the variable speed fan device 10 is optionally accomplished in the absence of any printed indicia and/or wording associated with the display surface 66 of the display panel 54. A related advantage resides in the ability to reduce a size of the display panel 54 otherwise used for printed indicia through the obviation of a need for such printed indicia. As yet another example, the intuitive nature of the control interface 20 results in an unobtrusive design that is visually interesting or otherwise pleasing to users and others.

In the foregoing detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The foregoing detailed description, therefore, is not to be taken in a limiting sense, and the scope of the present invention is defined by the appended claims.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of communicating an operational status of a variable speed fan device to a user, the method comprising:
   providing a variable speed fan device comprising:
      a motor, a fan blade, a controller, and a display panel maintaining a first plurality of discrete light sources configured to emit light in an activated state, the emitted light being visually perceptible from a display surface of the display panel at a plurality of light emission areas disposed along a perimeter;
   operating the motor to rotate the fan blade;
   generating an appearance of movement of light about the plurality of light emission areas by emitting light with the first plurality light sources in a predetermined pattern to communicate an operational status of the variable speed fan,
   wherein generating an appearance of movement of light about the exterior face includes generating an appearance of movement of a darkened area about the plurality of light emission areas.

2. The method of claim 1, wherein the appearance of movement of light about the plurality of light emission areas is substantially circular in direction.

3. The method of claim 1, further comprising:
   generating an appearance of substantially continuous movement of light about the plurality of light emission areas.

4. The method of claim 1, further comprising:
   rotating the fan blade at a first fan speed while generating the appearance of movement of light about the plurality of light emission areas at a first rate; and
   rotating the fan blade at a second fan speed greater than the first fan speed while generating the appearance of movement of light about the plurality of light emission areas at a second rate greater than the first rate.

5. The method of claim 1, further comprising:
   activating a single one of the plurality of light sources at any point in time when the fan blade is rotated at a first fan speed while generating an appearance of movement of light about the plurality of light emission areas to indicate the fan blade is rotating at the first fan speed; and
   activating two of the plurality of light sources at any point in time when the fan blade is rotated at a second fan speed greater than the first fan speed while generating an appearance of movement of light about the plurality of light emission areas to indicate the fan blade is rotating at the second fan speed.

6. The method of claim 1, wherein the variable speed fan device includes a filter, the method further comprising:
   determining a usefulness status of the filter; and
   generating the appearance of movement of light about the plurality of light emission areas while determining the usefulness status of the filter.

7. The method of claim 6, wherein the variable speed fan device further includes a second plurality of light sources including first light source characterized by a first color and a second light source characterized by a second color different from the first color, the method further comprising:
   activating the first light source and deactivating the second light source upon determining that the filter has a first usefulness status; and
   activating the second light source and deactivating the first light source upon determining that the filter has a second usefulness status different from the first usefulness status.

8. The method of claim 1, further comprising:
   determining whether the variable speed fan device is connected to a power source; and
   intermittently activating and deactivating at least one of the plurality of light sources at a predetermined rate to indicate the variable speed fan device is connected to a power source.

9. The method of claim 1, wherein the method is characterized by the absence of conveying of operational status information to the user via written indicia on the display surface.

10. The method of claim 1, wherein the variable speed fan device further includes a control knob maintaining the display panel and coupled to the controller, the method further comprising:
    operating the variable speed fan device in a first mode;
    conveying the first mode of operation to the user by the controller prompting selective activation and deactivation of the plurality of light sources on an individual basis in accordance with a first display routine corresponding with the first mode;
    causing the variable speed fan device to operate in a second mode upon user manipulation of the control knob; and
    conveying the second mode of operation to the user by the controller prompting selective activation and deactivation of the plurality of light sources on an individual basis in accordance with a second display routine corresponding with the second mode.

11. The method of claim 10, wherein the first mode is characterized the fan blade rotating at a first fan speed and the second mode is characterized by the fan blade rotating at second fan speed.

* * * * *

UNITED STATES PATENT AND TRADEMARK OFFICE
CERTIFICATE OF CORRECTION

| | | |
|---|---|---|
| PATENT NO. | : 7,806,961 B2 | Page 1 of 1 |
| APPLICATION NO. | : 11/384201 | |
| DATED | : October 5, 2010 | |
| INVENTOR(S) | : Casey L Carlson | |

It is certified that error appears in the above-identified patent and that said Letters Patent is hereby corrected as shown below:

Title Page, Column 2, item (56), under "Foreign Patent Document" – Delete duplicated citation "CN 2072610 U 3/1991"

Column 11, Line 65 – Delete "1001." and insert -- 100I. --, therefor.

Column 13, Line 28 – Delete "1001," and insert -- 100I, --, therefor.

Column 13, Line 65 – Delete "1 10" and insert -- 110 --, therefor.

Column 17, Lines 25-26 – Delete "electromechanical" and insert -- electro-mechanical --, therefor.

Column 18, Line 62 – In Claim 11, after "characterized" insert -- by --.

Signed and Sealed this
Eighteenth Day of January, 2011

David J. Kappos
*Director of the United States Patent and Trademark Office*